United States Patent
Jha et al.

(10) Patent No.: US 9,777,903 B2
(45) Date of Patent: Oct. 3, 2017

(54) EXTERIOR AIRCRAFT LIGHT

(71) Applicant: Goodrich Lighting Systems GmbH, Lippstadt (DE)

(72) Inventors: Anil Kumar Jha, Lippstadt (DE); Andre Hessling-von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 93 days.

(21) Appl. No.: 14/980,544

(22) Filed: Dec. 28, 2015

(65) Prior Publication Data
US 2016/0195239 A1 Jul. 7, 2016

(30) Foreign Application Priority Data
Jan. 2, 2015 (EP) .................................... 15150020

(51) Int. Cl.
*B64D 47/02* (2006.01)
*F21V 5/04* (2006.01)
(Continued)

(52) U.S. Cl.
CPC .............. *F21V 5/048* (2013.01); *B64D 47/02* (2013.01); *B64D 47/04* (2013.01);
(Continued)

(58) Field of Classification Search
CPC F21V 5/048; F21V 7/06; B64D 47/02; B64D 47/04; B64D 2203/00;
(Continued)

(56) References Cited

U.S. PATENT DOCUMENTS 6,191,541 B1 * 2/2001 Patel .................. H05B 33/0854
315/307
6,244,728 B1 * 6/2001 Cote ...................... B64D 47/06
362/249.06
(Continued)

FOREIGN PATENT DOCUMENTS

EP 2450279 A1 5/2012
EP 2532591 A2 12/2012
(Continued)

OTHER PUBLICATIONS

European Search Report for application No. 15150020.4; Mailing Date Jul. 20, 2015, 5 pages.

*Primary Examiner* — Bao Q Truong
(74) *Attorney, Agent, or Firm* — Cantor Colburn LLP

(57) ABSTRACT

An exterior aircraft light includes a base plate and a plurality of lighting units arranged on the base plate, wherein each of the plurality of lighting units includes an elongated LED light source for emitting light, the elongated LED light source having a light emitting surface with a longitudinal extension and a transverse extension, with the longitudinal extension being greater than the transverse extension and with a projection of the longitudinal extension onto the base plate defining an orientation direction of the elongated LED light source, and a collimating optical system for collimating the light emitted by the elongated LED light source towards a main output direction, wherein the plurality of lighting units has at least a first lighting unit and a second lighting unit.

17 Claims, 11 Drawing Sheets

(51) Int. Cl.
*B64D 47/04* (2006.01)
*F21S 8/10* (2006.01)
*F21V 7/06* (2006.01)
*F21W 101/06* (2006.01)
*F21Y 115/10* (2016.01)

(52) U.S. Cl.
CPC .............. *F21S 48/1154* (2013.01); *F21V 7/06* (2013.01); *B64D 2203/00* (2013.01); *F21W 2101/06* (2013.01); *F21Y 2115/10* (2016.08)

(58) Field of Classification Search
CPC ...... F21S 48/1154; F21S 48/21; F21S 48/215; F21S 48/218; F21Y 2115/10; F21W 2101/06; B60Q 1/00; B60Q 1/26
See application file for complete search history.

(56) References Cited

U.S. PATENT DOCUMENTS

| | | | |
|---|---|---|---|
| 6,431,728 B1* | 8/2002 | Fredericks ........... | B60Q 1/2696 |
| | | | 340/901 |
| 2016/0096635 A1* | 4/2016 | Hessling von Heimendahl ......... | B64D 47/02 |
| | | | 362/470 |
| 2016/0107767 A1* | 4/2016 | Jha ........................ | B64D 47/02 |
| | | | 362/470 |

FOREIGN PATENT DOCUMENTS

| | | | |
|---|---|---|---|
| EP | 2572990 A1 | 3/2013 | |
| WO | 2006033031 A2 | 3/2006 | |

\* cited by examiner

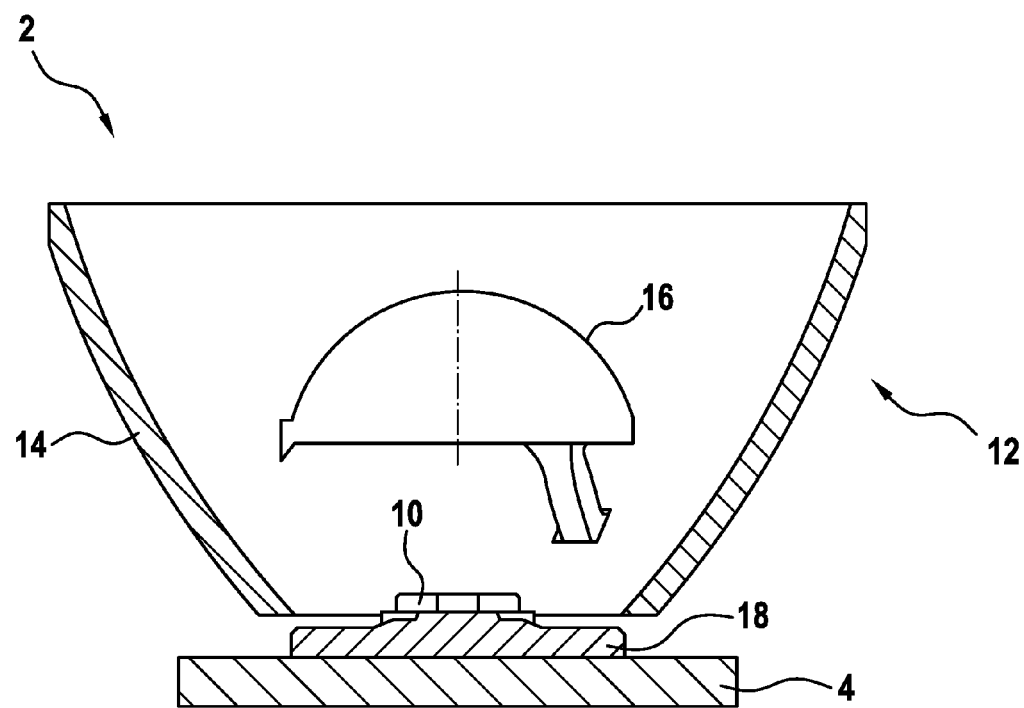

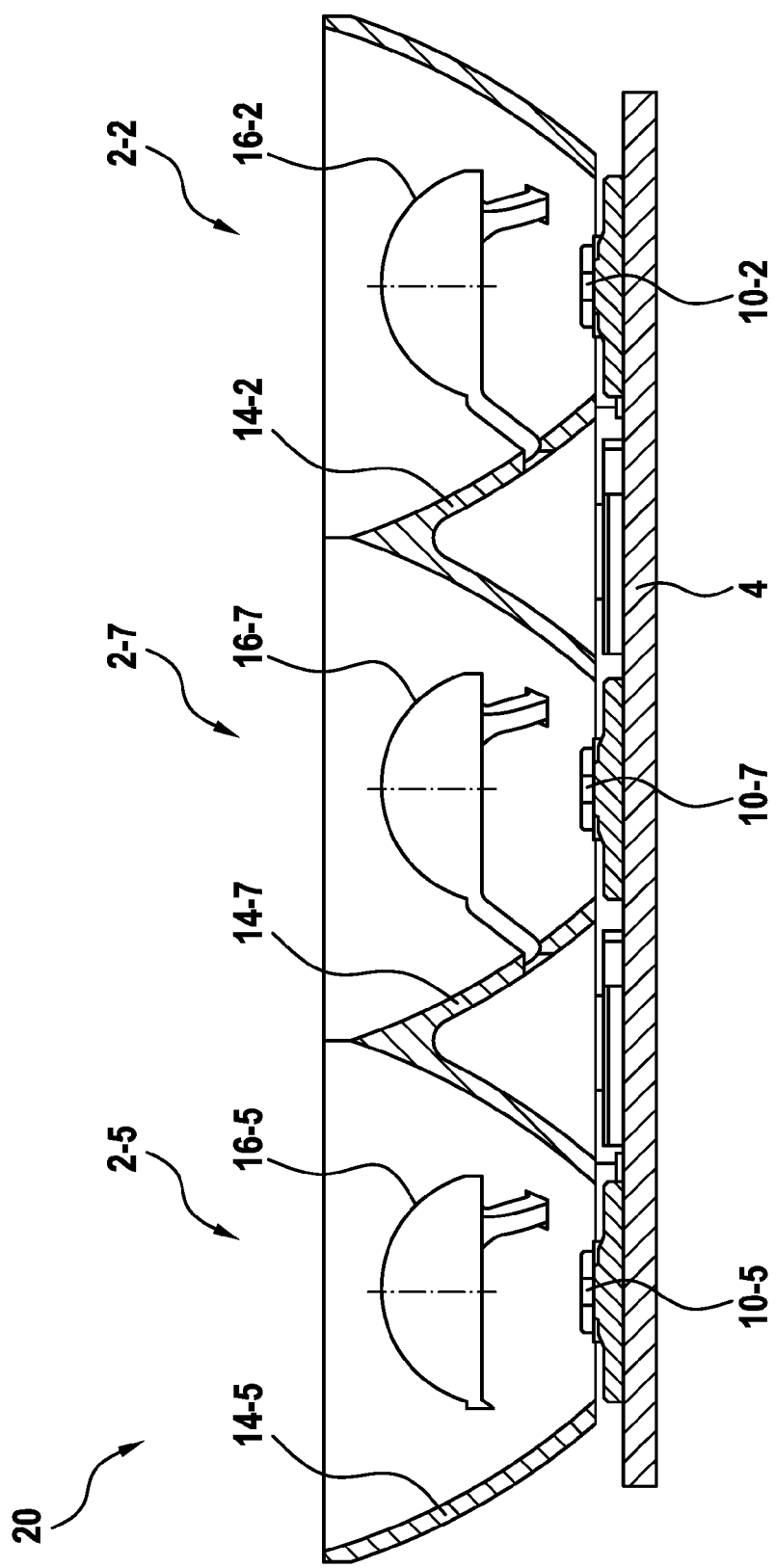

EXTERIOR AIRCRAFT LIGHT

FOREIGN PRIORITY

This application claims priority to European Patent Application No. 15 150 020.4 filed Jan. 2, 2015, the entire contents of which is incorporated herein by reference.

TECHNICAL FIELD

The present invention relates to exterior aircraft lighting. In particular, it relates to an exterior aircraft light that has a plurality of similar lighting units, such as for example employed as aircraft headlights.

BACKGROUND OF THE INVENTION

Almost all aircraft have exterior lighting. Exterior lighting serves a plurality of purposes. While some exterior aircraft lights provide active visibility, i.e. they allow for the pilots and the crew to examine the aircraft environment, other exterior aircraft lights provide for passive visibility, i.e. they make the aircraft visible to others, particularly in the dark. Yet other exterior aircraft lights are provided for illuminating certain parts of the aircraft, such as engine scan lights, or provide for an illumination of the immediate aircraft environment, such as cargo loading lights.

Some exterior aircraft light, in particular aircraft headlights, require a strong illumination of the respective target area. For this purpose, it is known to provide such exterior aircraft lights with a plurality of lighting units that are identical or similar in design and whose light outputs add up for achieving a desired illumination capacity. Such exterior aircraft lights, having a plurality of lighting units, often have undesired artefacts in their output light intensity distribution.

Accordingly, it would be beneficial to provide exterior aircraft lights with multiple lighting units that have an improved output light intensity distribution.

SUMMARY

Exemplary embodiments of the invention include an exterior aircraft light, comprising a base plate and a plurality of lighting units arranged on the base plate, wherein each of the plurality of lighting units comprises an elongated LED light source for emitting light, the elongated LED light source having a light emitting surface with a longitudinal extension and a transverse extension, with the longitudinal extension being greater than the transverse extension and with a projection of the longitudinal extension onto the base plate defining an orientation direction of the elongated LED light source, and a collimating optical system for collimating the light emitted by the elongated LED light source towards a main output direction, wherein the plurality of lighting units comprises at least a first lighting unit and a second lighting unit, with the orientation direction of the elongated LED light source of the first lighting unit and the orientation direction of the elongated LED light source of the second lighting unit being angled with respect to each other and with the main output direction of the first lighting unit and the main output direction of the second lighting unit being substantially parallel.

The angled orientation directions of the first and second lighting units allow for a reduction of undesired artefacts in the overall output light intensity distribution of the exterior aircraft light. In particular, artefacts in the output light intensity distribution of the first lighting unit are smoothened by the output light intensity distribution of the second lighting unit, and vice versa. In other words, non-avoidable artefacts of the individual lighting units due to the extended nature of the respective LED light sources do not add up, as they would for identical or parallel orientation directions of the elongated LED light sources, but at least partially cancel each other out due to the angled orientation directions of the elongated LED light sources. The artefacts of the individual lighting units arise from the fact that the collimating optical systems cannot perfectly collimate the light emitted by an extended light source. Even if the collimating optical systems were a perfectly collimating optical systems, which is not required by the exterior aircraft light according to the invention, they could only perfectly collimate light emitted by a point light source. However, with the LED light source having a longitudinal extension as well as a transverse extension, i.e. with the LED light source having an extended light emitting surface, the collimating action of the collimating optical systems is inherently imperfect. With such elongated LED light sources generally having surface points of higher light emission and surface points of lower light emission, the output light emission distribution of an individual lighting unit also has areas of higher light intensity and areas of lower light intensity. As said surface points of stronger light emission and surface points of lower light emission are often inherently contained in a particular type of elongated LED light source, such as a line arrangement of various LEDs, identical or parallel orientation directions of the elongated LED light sources across the plurality of lighting units could lead to the areas of lower emission superimposing and leading to comparably dark spots in the overall output light intensity distribution of the exterior aircraft light. The angled arrangement of the first and second lighting units prevents such superimposition and prevents or reduces areas in the output light intensity distribution of the exterior aircraft light that are perceived as dark spots.

The expression of the orientation direction of the elongated LED light source of the first lighting unit and the orientation direction of the elongated LED light source of the second lighting unit being angled with respect to each other means that the two orientation directions are not identical and that they are not parallel. The orientation directions are projections of the longitudinal extensions of the elongated LED light sources onto the base plate, because such projections onto a reference plane allow for a determination if the orientation directions are angled, parallel or identical. As the elongated LED light sources may be arranged at different heights with respect to the base plate and/or may be inclined with respect to the base plate, looking at the unprojected longitudinal extensions of the elongated LED light sources would not always allow for this assessment.

The language of the collimating optical system being provided for collimating the light emitted by the elongated LED light source towards a main output direction is to be understood in such a way that the optical system achieves a strong collimation arround the main output direction. However, due to practical optical systems commonly not being perfectly collimating and due to the extended nature of the LED light source, the collimating optical system does not provide for a perfect collimation, with all light emitted by the elongated light source being bundled in the main output direction. However, the collimating optical system provides for all light emitted by the elongated LED light source to be reflected and/or refracted towards the main output direction.

According to a further embodiment, the plurality of lighting units comprises at least 7 lighting units. In other words, the plurality of lighting units consists of n lighting units, with n being at least 7. It has been found that above described effect of cancelling artefacts can be made use of to a particularly high degree, when 7 or more lighting units are present in the exterior aircraft light. While it is possible that all of the orientation directions of the elongated LED light sources of the n lighting units are angled with respect to each other, it is also possible that some of the lighting units share a common orientation direction or a parallel orientation direction. In other words, it is also possible that certain subsets of lighting units have angled orientation directions, while other subsets have orientation directions that are not angled. Also, it is possible that all lighting units have substantially parallel main output directions. However, it is also possible that not all main output directions are substantially parallel, but that the main output directions are angled with respect to each other, particularly at an angle of less than 10°, more in particular at an angle of less than 5°.

According to a further embodiment, the plurality of lighting units consists of one of 7, 12, 14, 19, 27, 30, 33, 37, and 61 lighting units. The given numbers of lighting units allow for a particularly high packing density in an exterior aircraft light that has an overall circular arrangement of the plurality of lighting units. In this way, a particularly high ratio of overall illumination per head area of the exterior aircraft light can be achieved. Further beneficial numbers of light sources are presented in document R. L. Graham et al, "Dense packing of congruent circles in a circle", Discrete Mathematics 181 (1998), 139-154, Elsevier Science B. V., the contents of which is incorporated herein by reference.

According to a further embodiment, the exterior aircraft light has a head surface with a substantially circular outline, with the plurality of lighting units being arranged within that substantially circular outline.

According to a further embodiment, at least 50% of the lighting units, in particular at least 80% of the lighting units have orientation directions of the elongated light sources that are angled with respect to each other. In other words, the majority of the lighting units have orientation directions that differ from each other. In this way, the majority of the lighting units are arranged in such a manner with respect to each other that the artefacts in their individual output light intensity distributions do not coincide. In this way, the majority of lighting units contribute to an overall arrangement where bright areas in some of the individual output light intensity distributions of the lighting units help in illuminating comparably dark areas in other ones of the individual output light intensity distributions of the lighting units. While it is not necessary that the orientation directions of the elongated light sources of all lighting units are angled with respect to each other to achieve above described effects, it is possible that 100% of the lighting units have orientation directions of the elongated light sources that are angled with respect to each other. Again, the expression angled means that the respective pair of orientation directions in question are non-parallel and non-identical.

According to a further embodiment, the orientation directions of the elongated light sources of said at least 50% of the lighting units, in particular of said at least 80% of the lighting units, are angled at more than 5° with respect to each other. In particular, they may be angled at more than 10° in respect with each other. In this way, the orientation directions have a substantial angle between them, such that above described cancelling of the artefacts of the individual lighting units is present to a larger degree than in the case of angles below 5°. The selection of a particularly beneficial angle between respective pairs of orientation directions also depends on the particular output light intensity distributions of the individual lighting units.

Alternatively/additionally, the exterior aircraft light may be embodied in such a way that the plurality of lighting units consists of n lighting units and that the orientation directions of the elongated light sources of said at least 50% of the lighting units, in particular of said at least 80% of the lighting units, are angled at more than 360°/2n with respect to each other. In this way, large angles between the orientation directions are ensured for the given number of lighting units, leading to an overall good cancelling of the artefacts of the individual lighting units.

According to a further embodiment, the plurality of lighting units consists of n lighting units and the orientation directions of the n lighting units are angled at respective angles $\alpha_k$ with respect to a reference direction on the base plate, with $(360°/n)* k-(d*(360°/n)) \leq \alpha_k \leq (360°/n)*k+(d*(360°/n))$, with k being between 1 and n and with d being between 0 and 0.2. In this way, the orientation directions are fairly equally distributed around the 360° of the base plate with respect to the reference direction, leading to a favourable cancelling out of the artefacts of the individual output light intensity distributions of the individual lighting units. In above formula, k is a variable, running from 1 to n, and denoting the individual lighting units. In particular, the first lighting unit may have the orientation direction $\alpha_1$, the second lighting unit may have the orientation direction $\alpha_2$, the third lighting unit may have the orientation $\alpha_3$, etc. In other words, the variable k denotes the angle of the orientation direction of the k-th lighting unit, with k being between 1 and n. Exemplary values for d are 0,2, 0,1, 0,05, and 0. With d being 0, the orientation directions of the lighting units are equally spaced around the 360° of the reference plane. With d being non-zero, the orientation directions can deviate from the equal spacing to a small extent, making production of the exterior aircraft light less complex, but still allowing for a favourable cancelling of artefacts.

According to a further embodiment, the main output directions of any two of the plurality of lighting units enclose an angle of less than 10°, in particular of less than 5°. In this way, an overall very collimated, i.e. very targeted output light intensity distribution of the exterior aircraft light is achieved. In this way, a large light intensity in a particular target direction, which may be required by regulations and/or aircraft manufacturer requirements, can be achieved by the exterior aircraft light. It is explicitly pointed out that it is not necessary that all lighting units have substantially parallel main output directions. The main output directions may be angled on purpose in order to achieve particular output light intensity distributions of the exterior aircraft light, such as oval or other suitable output light intensity distributions.

According to a further embodiment, the elongated LED light source of each of the plurality of lighting units comprises a plurality of LEDs, arranged in a line configuration. Such LED line configurations are available as integrated components, providing for strong light output on a small surface. These components are also often referred to as multi-chip LEDs. Due to their high integration, they work particularly well with collimating optical systems. While they have an extended light emitting surface, all of the plurality of LEDs can be arranged very close to the focal point of the optical system, leading to a high degree of collimation despite the extended light emitting surface. In a particular embodiment, the elongated LED lights of each of the plurality of lighting units has one of 2, 3, 4, 5, 6, 7, 8, 9 or 10 LEDs. In other words, the plurality of LEDs of each of the plurality of lighting units may consist of 2, 3, 4, 5, 6, 7, 8, 9 or 10 LEDs. It is possible that each of the plurality of lighting units has the same number of LEDs. However, it is also possible that different lighting units of the exterior aircraft lights have different numbers of LEDs in their elongated LED light sources. Further, it is also possible that the plurality of LEDs are arranged in a matrix configuration or any other suitable geometric arrangement. It is further also possible that the elongated LED light source of one or some or each of the plurality of lighting units comprises exactly one LED having an extended light emitting surface.

According to a further embodiment, the collimating optical system of each of the plurality of lighting units comprises a parabolic reflector and a collimating lens, with the light from the respective elongated LED light source being partially collimated by the parabolic reflector and partially collimated by the collimating lens. In other words, a portion of the light emitted by the elongated LED light source is collimated towards the main output direction by the parabolic reflector, while another part of the light emitted by the elongated LED light source is collimated toward the main output direction by the collimating lens. In a particular embodiment, the light emitted by the elongated LED light source is either reflected by the parabolic reflector or refracted by the collimating lens. In other words, the two optical elements of the parabolic reflector and the collimating lens affect mutually exclusively portions of the light emitted by the elongated LED light source. The language of the respective elongated LED light source refers to the particular elongated LED light source that is present in the respective lighting unit. In other words, each elongated LED light source is associated with one parabolic reflector and one collimating lens, with those elements belonging to the same lighting unit. As lenses are particularly prone to transferring artefacts of light sources into the output light intensity distribution, above discussed beneficial cancelling of artefacts of individual lighting units is particularly helpful in embodiments where the lighting unit comprises a collimating lens.

According to a further embodiment, a focal point of the collimating optical system of each of the plurality of lighting units is positioned on the light emitting surface of the respective elongated LED light source. In other words, the elongated LED light source is positioned in such a way with respect to the collimating optical system that the focal point of the collimating optical system is on the light emitting surface of the elongated LED light source. In this way, the collimating capability of the collimating optical system can be made use of to a large extend.

According to a further embodiment, the elongated LED light source of each of the plurality of lighting units comprises an odd number of LEDs, arranged in a line configuration, with a respective center LED of the odd number of LEDs being positioned in the focal point of the respective collimating optical system. In this way, it is ensured, that all of the LEDs are as close to the focal point of the collimating optical system as possible. This allows for keeping the deviations from a perfect collimation of the light low.

According to a further embodiment, an output light intensity distribution of the exterior aircraft light has a principle light output direction, and the output light intensity distribution is a monotonically decreasing light intensity distribution around the principle light output direction. Such a monotonically decreasing light intensity distribution is particularly well-suited for illuminating the aircraft environment for a human operator, such as the pilot. This is because the human eye adapts particularly well to light intensity gradients. Thus, the human eye perceives non-monotonic sections of a light intensity distribution as dark spots. Eliminating such non-monotonic sections from the light intensity distribution results in the output light intensity distribution being perceived as not having dark spots by the human operator.

According to a further embodiment, an output light intensity distribution of the exterior aircraft light is a rotationally symmetric light intensity distribution. Such a rotationally symmetric light intensity distribution allows for a particularly uniform illumination arround a target direction. This is particularly desirable in the field of aircraft head lights, such as aircraft landing lights.

According to a further embodiment, an output light intensity distribution of the exterior aircraft light is a substantially circular output light intensity distribution.

According to a further embodiment, the exterior aircraft light has a power rating in the range of between 30 W and 150 W.

According to a further embodiment, the exterior aircraft light is an aircraft head light. In a particular embodiment, the exterior aircraft light may be an air plane landing light, an air plane take off light, an air plane taxi light, an air plane runway turn off light, or a rotorcraft search light. The cancelling of artefacts is particularly beneficial for these kinds of aircraft head lights, because they usually require a large illumination capacity and thus commonly have a plurality of individual lighting units.

Exemplary embodiments of the invention further include an aircraft, such as an air plane or a rotorcraft, which comprises at least one exterior aircraft light, as described in any of the embodiments above. Above described modifications, additional features, and advantages equally apply to the aircraft and can be embodied in an analogous manner in the aircraft environment.

BRIEF DESCRIPTION OF DRAWINGS

Further exemplary embodiments are described with respect to the accompanying drawings, wherein:

FIG. 1 shows an exemplary lighting unit in a cross-sectional view that can be used with an exterior aircraft light in accordance with exemplary embodiments of the invention.

FIG. 2*b* shows the exterior aircraft light of FIG. 2*a* in a cross-sectional view.

DETAILED DESCRIPTION OF THE INVENTION

Figure 2A:
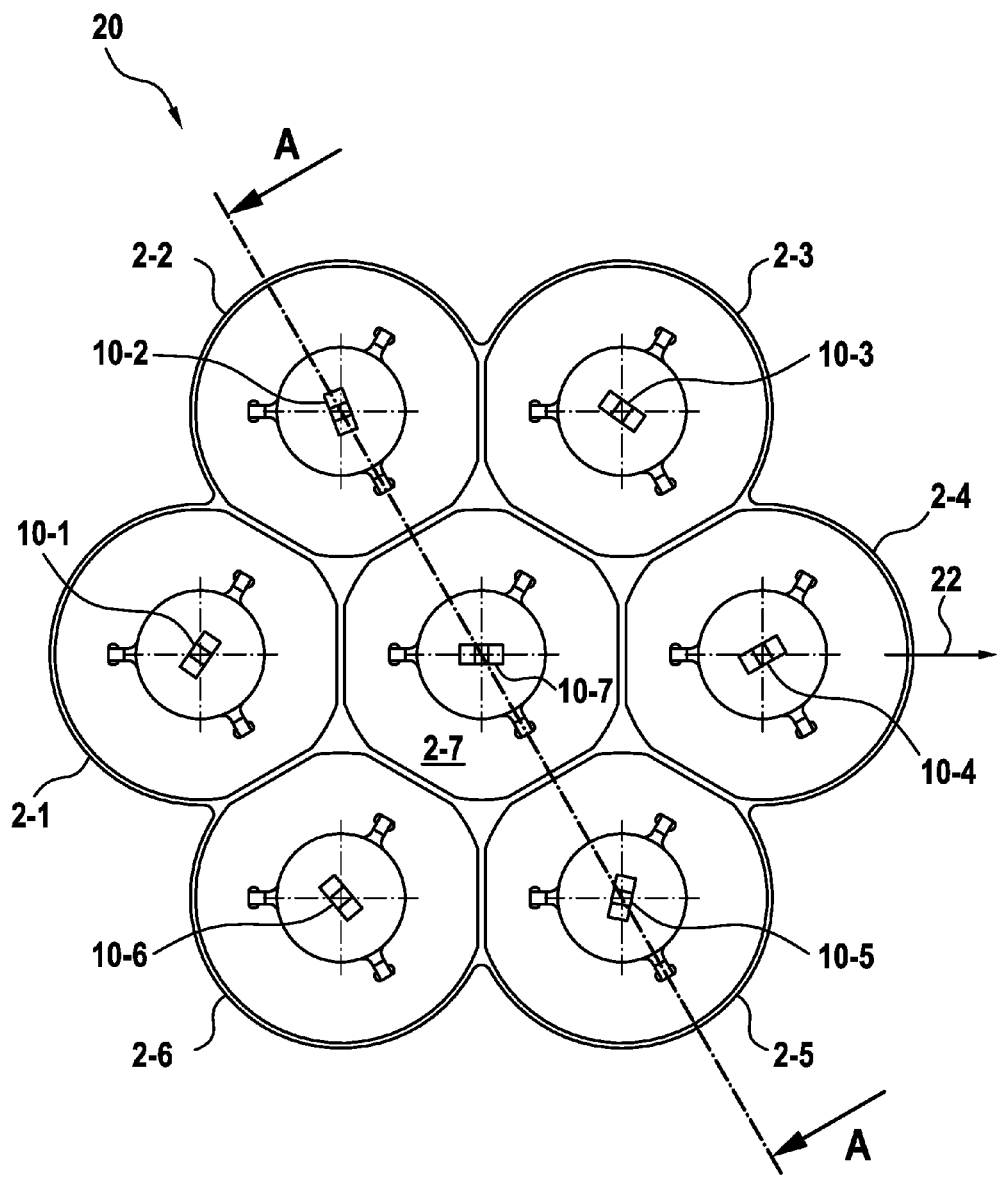
FIG. 2*a* shows an exterior aircraft light in accordance with an exemplary embodiment of the invention in a top view.

FIG. 1 shows an exemplary lighting unit 2, arranged on an exemplary base plate 4, wherein the exemplary lighting unit 2 can be used in exterior aircraft lights in accordance with exemplary embodiments of the invention.

The lighting unit 2 has a mounting structure 18, onto which an elongated LED light source 10 is mounted. The lighting unit 2 further comprises a collimating optical system 12, which is also mounted to the mounting structure 18. The mounting structure 18 provides for the attachment between the elongated LED light source 10 and the collimating optical system 12 and the base plate 4. In this way, the mounting structure 18 fixes the geometric relationship of these components to each other. It is pointed out that it is also possible that the elongated LED light source 10 and the collimating optical system 12 are directly mounted to the base plate 4.

The collimating optical system 12 comprises a parabolic reflector 14 and a collimating lens 16. The collimating lens 16 is attached to the parabolic reflector 14 by a mounting arm. The parabolic reflector 14 and the collimating lens 16 are arranged with respect to each other in such a way that their focal points coincide. The collimating lens 16 is arranged within the parabolic reflector 14, i.e. the parabolic reflector 14 surrounds the collimating lens 16. The parabolic reflector 14 has a lower opening facing he base plate 4, where the elongated LED light source 10 is arranged, and an upper opening, which is shown towards the top in the drawing plane of FIG. 1 and through which the light is emitted by the lighting unit 2. In the particular embodiment of FIG. 1, the lower opening of the parabolic reflector 14 has the same size as the circumference of the collimating lens 16. In other words, the dimensions of the collimating lens 16 correspond to the dimensions of the lower opening of the parabolic reflector 14. In the particular embodiment of FIG. 1, the parabolic reflector 14 and the collimating lens 16 are an integrated part made of injection-moulded plastic. The parabolic reflector 14 is made reflective by metallising, which metallising in a production step where the collimating lens 16 is masked.

The elongated LED light source 10 consists of three LEDs. The center LED of the elongated LED light source is positioned with respect to the parabolic reflector and the collimating lens 16 in such a way, that the focal points of the parabolic reflector 14 and the collimating lens 16 coincide with a point on the light emitting surface of the elongated LED light source 10. The other two LEDs of the elongated LED light source 10 are offset from the focal point. In particular, they are offset to the right and to the left, respectively, in the cross-sectional view of FIG. 1.

The operation of the lighting unit 2 is described as follows. When switched on, the three LEDs of the elongated LED light source 10 emit light. This light is emitted roughly towards the top half plane of the drawing plane of FIG. 1. In other words, the light is emitted towards all portions of the parabolic reflector 14 and the collimating lens 16. When looking at the light rays emitted from the focal point of the collimating optical system 12, a portion of the light rays is collimated into a main output direction by the parabolic reflector 14, while another portion of the light rays is collimated into the main output direction by the collimating lens 16. The main output direction is towards the top in the drawing plane of FIG. 1.

All light rays leaving the elongated LED light source 10 outside of the focal point of the collimating optical system 12 are refracted or reflected towards the main output direction. However, due to their origin being outside of the focal point, this collimation action is not perfect. Accordingly, the output light intensity distribution of the lighting unit 2 is not a perfectly collimated beam. Instead, the output light intensity distribution is an image of the light intensity distribution emitted by the elongated LED light source 10. With three LEDs being present in the elongated LED light source 10, the light emission from the elongated LED light source is not very strong or even not present at all at the boundaries between the individual LEDs. Accordingly, the light intensity distribution emitted by the elongated LED light source has area of lower light intensity and areas of higher light intensity. These areas are translated into respective areas in the output light intensity distribution of the lighting unit 2 via the refraction/reflection by the collimating optical system 12. In other words, the image produced by the collimating optical system also has area of lower light intensity and areas of higher light intensity. The resulting dark areas are undesired artefacts in the output light intensity distribution of the lighting unit 2.

FIG. 2a shows an exterior aircraft light 20 in accordance with an exemplary embodiment of the invention in a top view. The exterior aircraft light 20 has 7 lighting units 2-1, 2-2, 2-3, 2-4, 2-5, 2-6, and 2-7. The first lighting unit is denoted with reference numeral 2-1, the second lighting unit is denoted with reference numeral 2-2, etc. In abbreviated form, the k-th lighting unit is denoted with reference numeral 2-k, with k being between 1 and 7.

Each of the lighting units 2-1 to 2-7 is constructed substantially in accordance with the embodiment of the lighting unit 2, depicted in FIG. 1. As compared to the lighting unit 2 of FIG. 1, the parabolic reflectors of the lighting units 2-1 to 2-7 are cut off at the touching points between different lighting units, in order to achieve a higher packing density of the lighting units. This will be explained in greater detail below with respect to FIG. 2b.

The first to sixth lighting units 2-1 to 2-6 are arranged in a circular pattern, with the seventh lighting unit 2-7 being arranged in the middle of said circle. In this way, the seven lighting units 2-1 to 2-7 have an overall circular arrangement, i.e. their overall structure can be circumscribed by a circular outline that touches all of the first to sixth lighting units 2-1 to 2-6.

All of the lighting units 2-1 to 2-7 have a collimating optical system that substantially corresponds to the collimating optical system 12, as described with respect to FIG. 1, i.e. they have a parabolic reflector in combination with a collimating lens. Further, the lighting units 2-1 to 2-7 each have a respective elongated LED light source. The first lighting unit 2-1 has an elongated light source denoted with reference numeral 10-1, the second lighting unit 2-2 has an elongated LED light source denoted with reference numeral 10-2, etc. All of the elongated LED light sources 10-1 to 10-7 consist of three LEDs, as described with respect to FIG. 1.

In the frame of reference of the exterior aircraft light 20, i.e. in the projection of the exterior aircraft light 20 onto the base plate 4, all of the elongated LED light sources 10-1 to 10-7 are angled with respect to each other. Stated differently, all of the elongated LED light sources 10-1 to 10-7 have different orientation directions with respect to a reference direction 22, shown towards the right in the drawing plane of FIG. 2a. In particular, each of the elongated LED light sources 10-k, with k running from 1 to 7, is angled with respect to the reference direction 22 in accordance with the following formula:

$$\alpha_k = k*(360°/7)$$

In this way, all the elongated LED light sources 10-k are angled with respect to each other, with the angles to the reference direction 22 being distributed equally within a 360° range.

As the elongated LED light sources are angled with respect to each other, the resulting images of the elongated LED light sources, as produced by the respective optical systems of the lighting units 2-1 to 2-7, are angled with respect to each other as well. In this way, it is ensured that comparably dark portions of the individual output light intensity distributions do not coincide. Rather, with the images of the elongated LED light sources 10-1 to 10-7 being rotated with respect to each other, comparably brighter portions of some of the lighting units coincide with comparably darker portions of others of the lighting units, and vice versa. In this way, an overall output light intensity distribution is achieved that is well-behaved and is perceived as not having dark spots and artefacts.

FIG. 2b shows a cross-sectional view of the exterior aircraft light 20 of FIG. 2a. The cross-sectional view is taken across the second, fifth and seventh lighting unit 2-2, 2-5, and 2-7, with the viewing direction being indicated by the letters A in FIG. 2a. It can be seen from FIG. 2b that the lighting units 2-2, 2-5, and 2-7 have a substantially identical construction. The elongated LED light sources 10-2, 10-5, 10-7 as well as the parabolic reflectors 14-2, 14-5, 14-7 as well as the collimating lenses 16-2, 16-5, 16-7 have a corresponding arrangement to each other, such that the main output directions of the three lighting units are parallel to each other, i.e. they coincide in the far field. The three lighting units are arranged on one base plate 4 via respective mounting structures.

It is pointed out that the exterior aircraft light unit has further elements, such as a lens cover, a housing, and control and power supply circuitry. These elements are not shown for a clear representation of the exemplary embodiment of the invention.

It can further be seen from FIG. 2b that the parabolic reflectors of the three lighting units have a smaller height extension at contacting points between the lighting units than at the outside of the exterior aircraft light 20. In this way, a higher packing density can be achieved, while this slightly shorter reflective surface of the parabolic reflector at the contact point has very low influence on the collimating action of the respective lighting units.

Figure 3A:
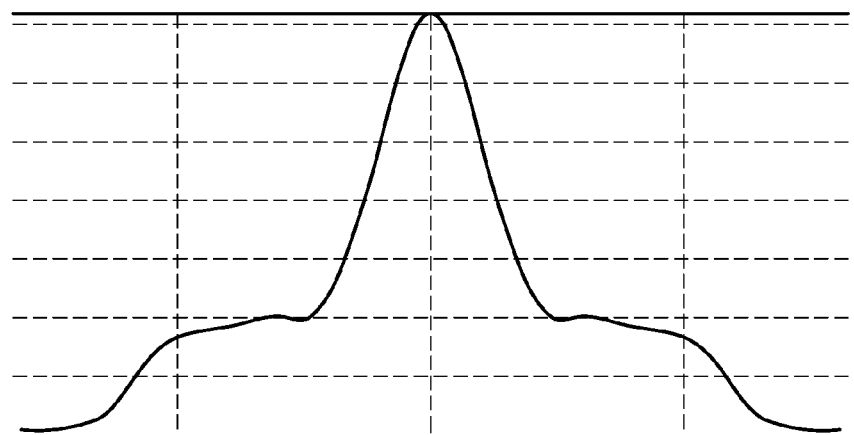
FIGS. 3*a*-3*b* show the light intensity distribution of the exterior aircraft light of FIG. 2*a* in a cross-sectional view in functional form, with comparison to a prior approach.

FIG. 3a shows the output light intensity distribution of the exterior aircraft light 20 in a cross-section through the exterior aircraft light 20 that is parallel to the base plate 4 and that includes the reference direction 22, shown in FIG. 2a. It can be seen that the peak light intensity is in a direction normal to the base plate 4 of the exterior aircraft light 20, which is also referred to as the principal light output direction of the exterior aircraft light 20. In the exemplary embodiment of FIG. 2a, the principal light output direction of the exterior aircraft light 20 coincides with the main output directions of all lighting units 2-1 to 2-7 in the far field. In the depicted cross-section, the output light intensity distribution of the exterior aircraft light has a monotonic decrease for an increasing deviation of the output angle from the principal light emission direction. Such a monotonic decreasing output light intensity distribution is perceived as not having dark spots by the human observer.

Figure 3B:
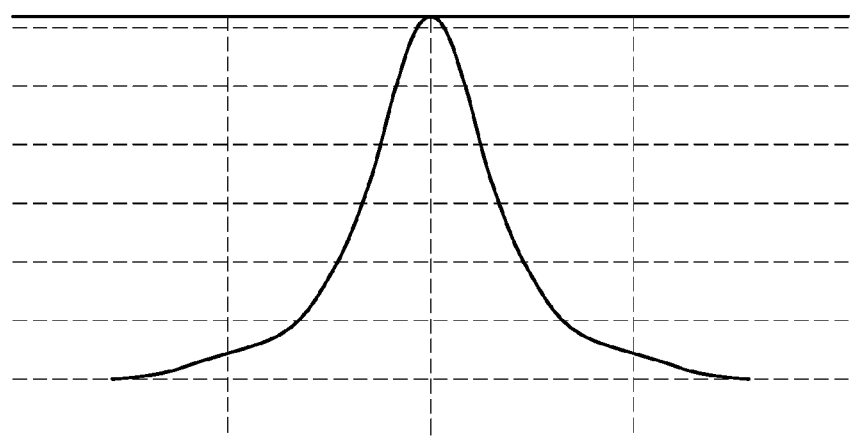

For comparison purposes, FIG. 3b shows an output light intensity distribution that would result if all the elongated LED light sources 10-1 to 10-7 would have their orientation direction either identical with or parallel to the reference direction 22. As can be seen from FIG. 3b, the resulting output light intensity distribution would not be monotonically decreasing around the principle light output direction and would therefore be perceived as having dark spots.

Figure 4A:
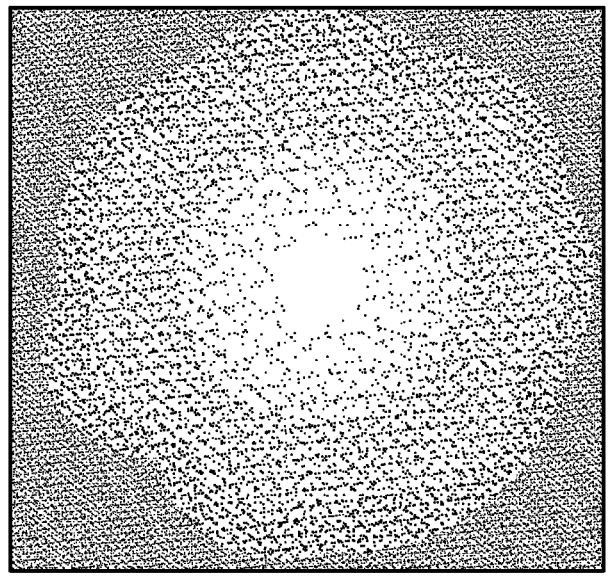
FIGS. 4*a*-4*b* show the output light intensity distribution of the exterior aircraft light of FIG. 2*a* on a target surface in a gray-scale illustration, with comparison to a prior approach.
Figure 4B:
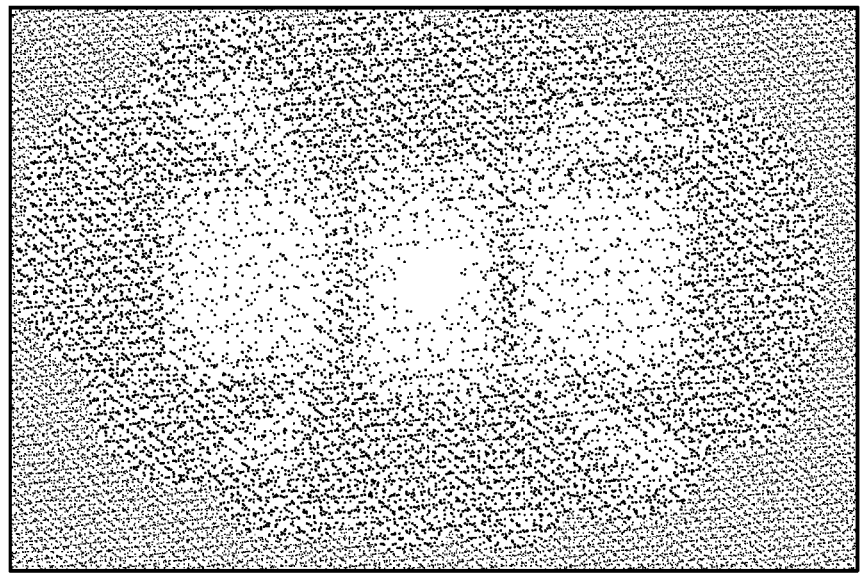
Figure 5A:
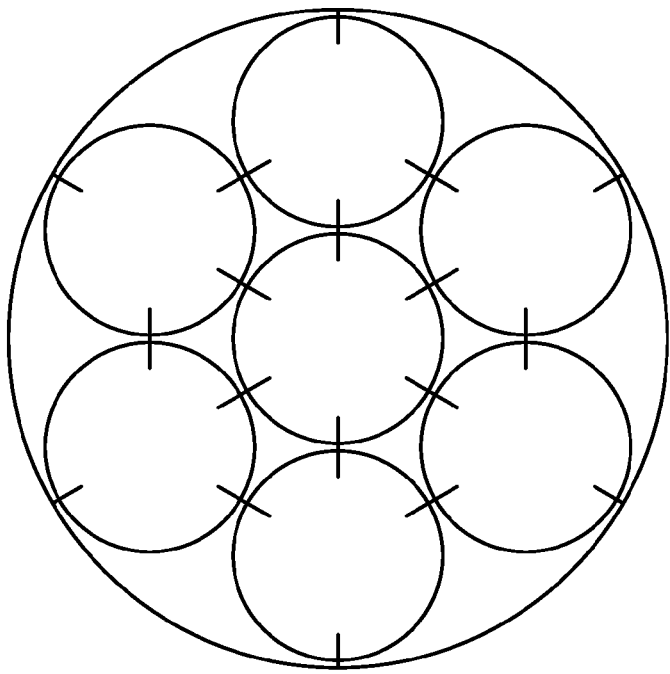
FIG. 5*a*-5*i* show various arrangements of lighting units in exemplary exterior aircraft lights in accordance with the invention in respective top views.
Figure 5B:
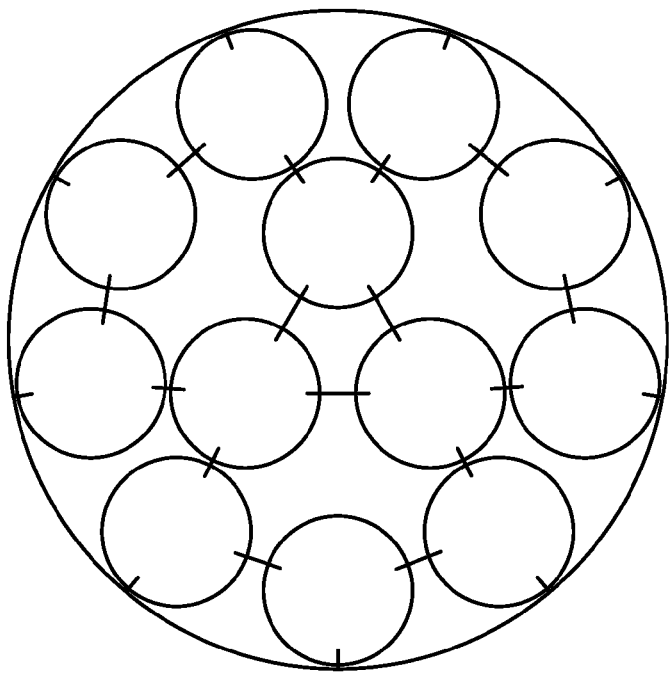
Figure 5C:
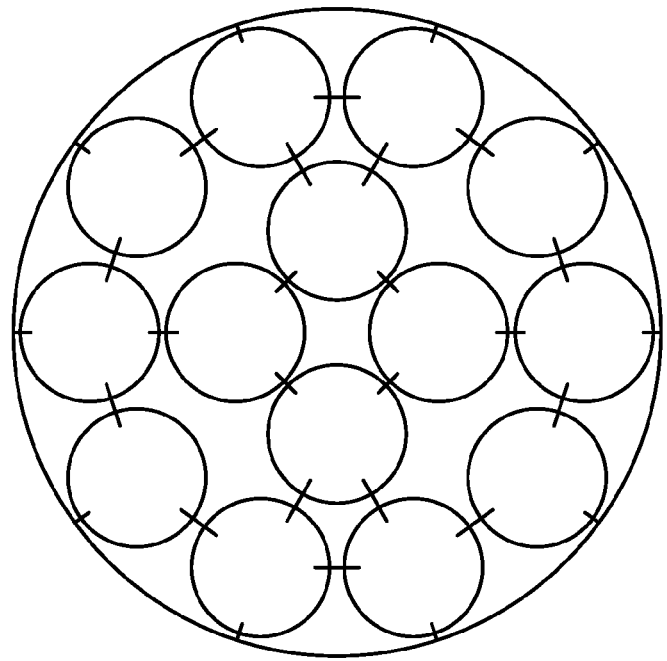
Figure 5D:
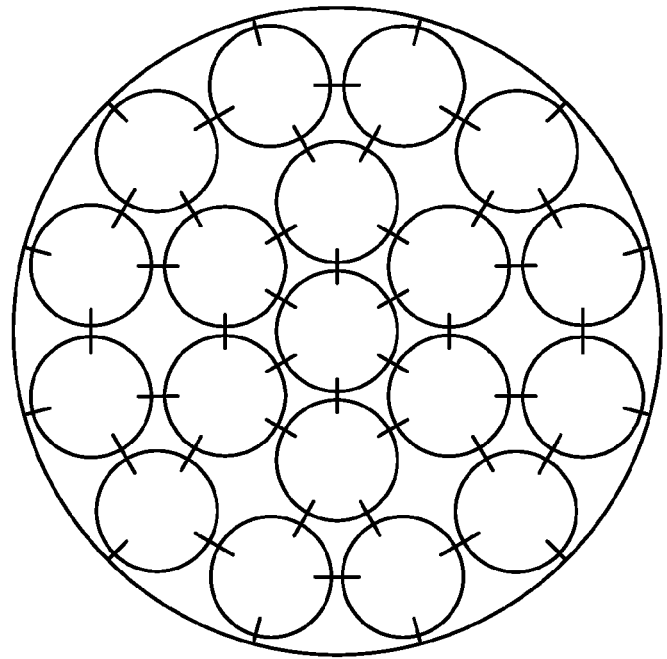
Figure 5E:
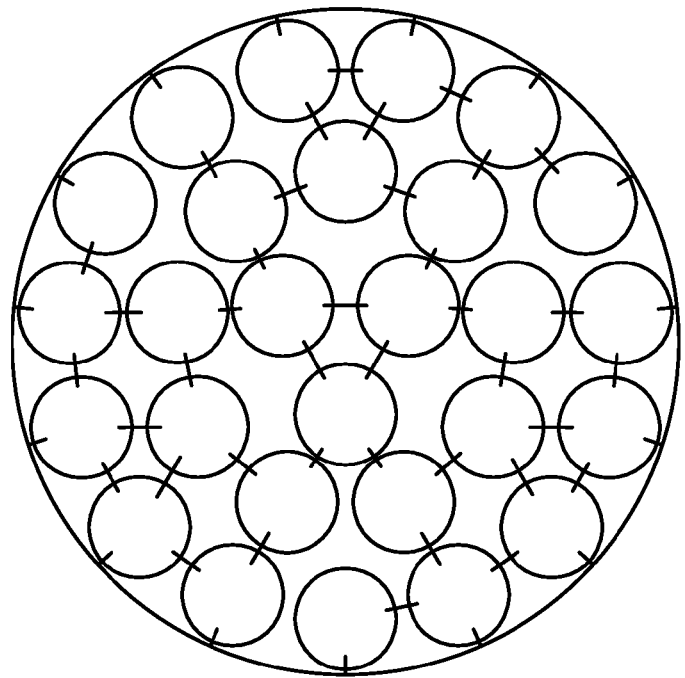
Figure 5F:
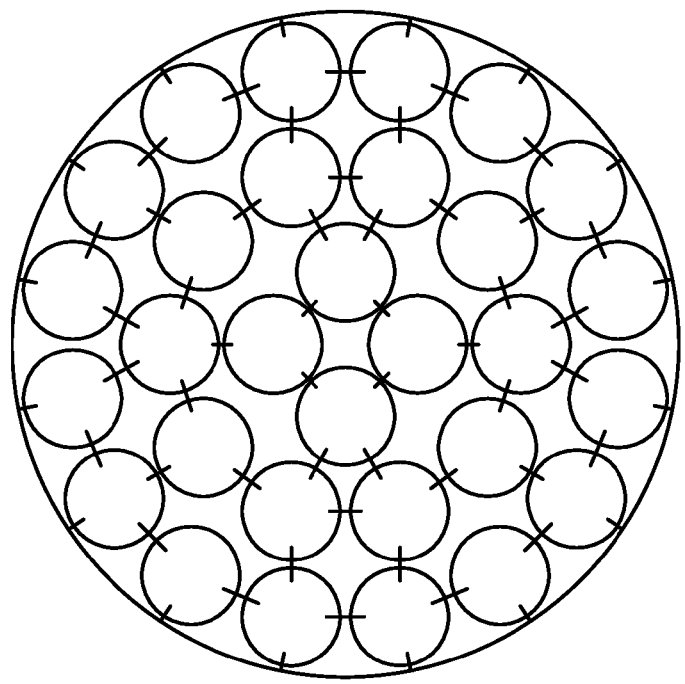
Figure 5G:
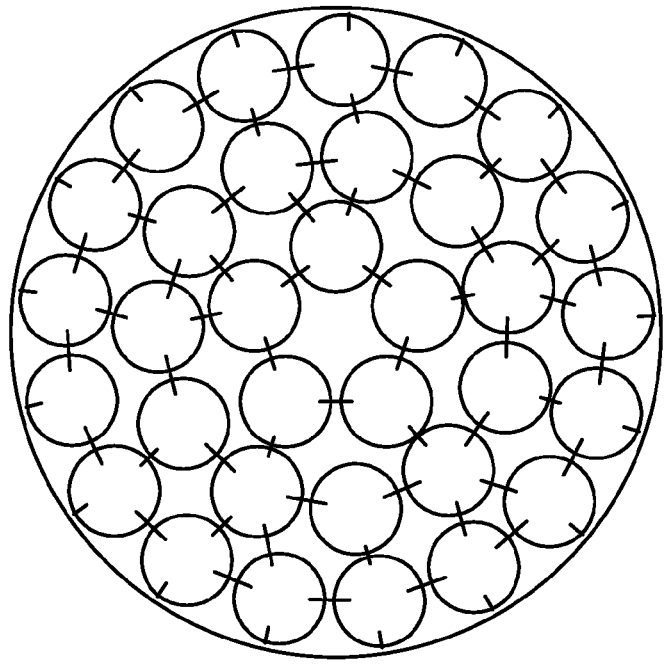
Figure 5H:
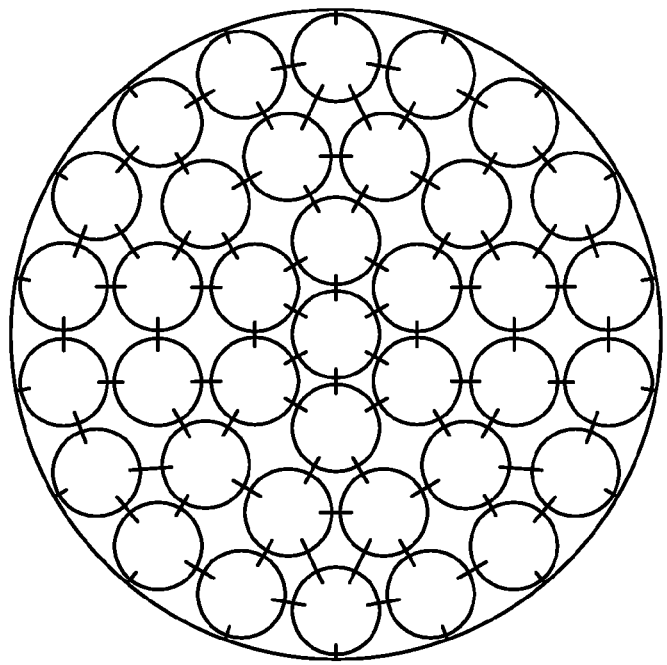
Figure 5I:
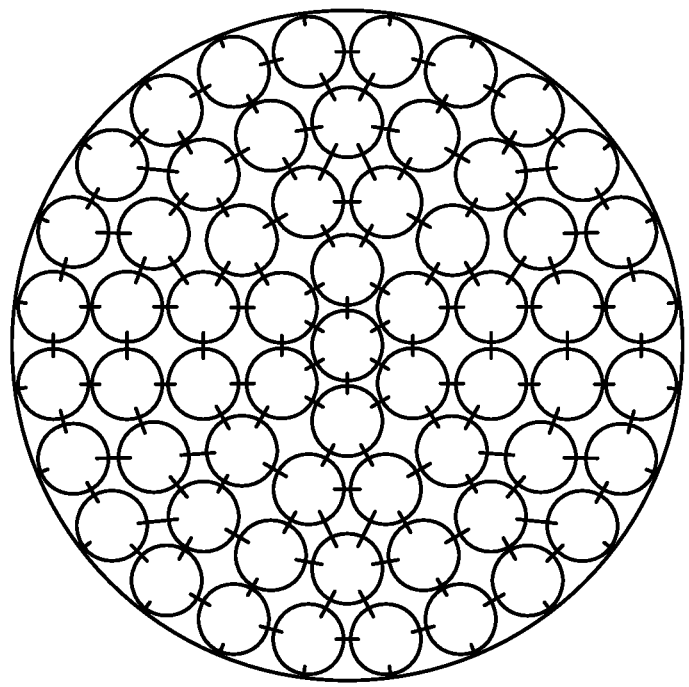

This is further illustrated by FIG. 4, wherein FIG. 4a shows the output light intensity distribution of the exterior aircraft light 20 of FIG. 2a on a target surface. The achieved illumination of the target surface has a very bright central portion and a gradual decrease of the brightness towards the outside in all directions. In particular, the achieved illumination of the target surface is rotationally symmetric. FIG. 4b again shows the hypothetical case of all elongated light sources 10-1 to 10-7 being oriented in a direction identical with or parallel to the reference direction 22. In this case, the artefacts of the individual output light intensity distribution of the individual lighting units would be reinforcing, leading to clearly discernible dark lines to the left and right of the bright central portion. These lines represent the superimposed images of the borders between the individual LEDs of the respective elongated LED light sources of the individual lighting units.

FIG. 5 shows various arrangements of respective pluralities of lighting units that are arranged besides each other in respective exterior aircraft lights. The geometric arrangements of the exterior aircraft lights of FIG. 5 are shown schematically in a top view. While the overall head surface extension of the exterior aircraft lights is shown as a black circle, the positions of the individual lighting units are shown as white circles. FIG. 5a shows an arrangement of 7 lighting units within the overall head surface of the exterior aircraft light. FIG. 5b shows an arrangement of 12 lighting units within the overall head surface of the exterior aircraft light. FIG. 5c shows an arrangement of 14 lighting units within the overall head surface of the exterior aircraft light. FIG. 5d shows an arrangement of 19 lighting units within the overall head surface of the exterior aircraft light. FIG. 5e shows an arrangement of 27 lighting units within the overall head surface of the exterior aircraft light. FIG. 5f shows an arrangement of 30 lighting units within the overall head surface of the exterior aircraft light. FIG. 5g shows an arrangement of 33 lighting units within the overall head surface of the exterior aircraft light. FIG. 5h shows an arrangement of 37 lighting units within the overall head surface of the exterior aircraft light. FIG. 5i shows an arrangement of 61 lighting units within the overall head surface of the exterior aircraft light. All of the depicted arrangements have a favourable ratio of head surface of the lighting units over overall head surface of the exterior aircraft light. It is pointed out that FIGS. 5a to 5i are only intended to illustrate the relationship between the overall extension of the head surface of the exterior aircraft light and the arrangement of the individual lighting units therein. FIGS. 5a to 5i can be scaled as desired. For example, a larger number of lighting units may lead to a larger extension of the head surface of the exterior aircraft light.

Figure 6A:
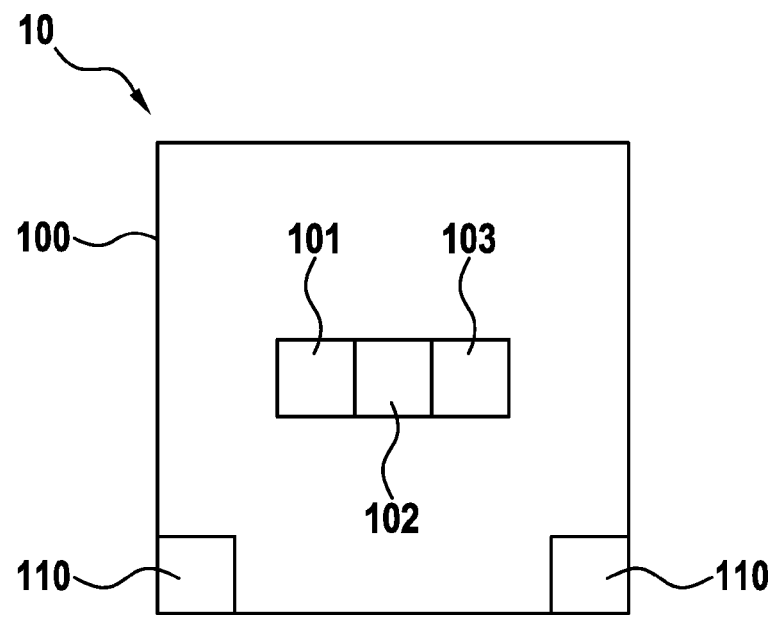
FIG. 6*a*-6*b* show exemplary elongated LED light sources in a top view that can be used with an exterior aircraft light in accordance with exemplary embodiments of the invention.

FIG. 6a shows an exemplary embodiment of an elongated LED light source 10 that can be used in exemplary embodiments of an exterior aircraft light in accordance with the present invention. For example, the elongated LED light source 10 of FIG. 6a may be used with the exemplary aircraft light unit of FIG. 2. The elongated LED light source 10 of FIG. 6a has three LEDs 101, 102, 103, arranged in a line configuration on a chip 100. The chip 100 has two electrical connections 110 for being supplied with electrical power. It is apparent to the skilled person that the chip 100 has suitable circuitry connecting the electrical connections 110 to the three LEDs 101, 102, 103.

Figure 6B:
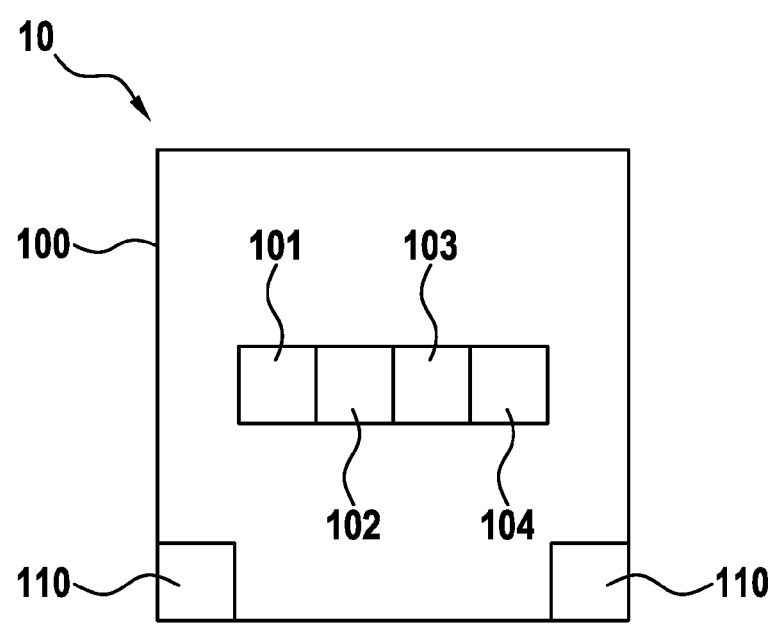

FIG. 6b shows a further exemplary embodiment of an elongated LED light source 10 that can be used in exemplary embodiments of an exterior aircraft light in accordance with the present invention. The elongated LED light source 10 of FIG. 6b corresponds to the elongated LED light source 10 of FIG. 6a, with the exception that four LEDs 101, 102, 103, 104 are provided in a line configuration. It is pointed out that more or less LEDs can be provided in the LED light source, such as 2, 3, 4, 5, 6, 7, 8, 9 or 10 LEDs. The LEDs may be arranged in one line or in two adjacent lines. More lines are possible as well.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An exterior aircraft light, comprising a base plate and a plurality of lighting units arranged on the base plate,
   wherein each of the plurality of lighting units comprises:
      an elongated LED light source for emitting light, the elongated LED light source having a light emitting surface with a longitudinal extension and a transverse extension, with the longitudinal extension being greater than the transverse extension and with a projection of the longitudinal extension onto the base plate defining an orientation direction of the elongated LED light source, and
      a collimating optical system for collimating the light emitted by the elongated LED light source towards a main output direction,
   wherein the plurality of lighting units comprises at least a first lighting unit and a second lighting unit, with the orientation direction of the elongated LED light source of the first lighting unit and the orientation direction of the elongated LED light source of the second lighting unit being angled with respect to each other and with the main output direction of the first lighting unit and the main output direction of the second lighting unit being substantially parallel.

2. An exterior aircraft light according to claim 1, wherein the plurality of lighting units comprises at least 7 lighting units.

3. An exterior aircraft light according to claim 1, wherein the plurality of lighting units consists of one of 7, 12, 14, 19, 27, 30, 33, 37, and 61 lighting units.

4. An exterior aircraft light according to claim 1, wherein at least 50% of the lighting units, have orientation directions of the elongated light sources that are angled with respect to each other.

5. An exterior aircraft light according to claim 4,
   wherein the orientation directions of the elongated light sources of said at least 50% of the lighting units, are angled at more than 5° with respect to each other, and/or
   wherein the plurality of lighting units consists of n lighting units and wherein the orientation directions of the elongated light sources of said at least 50% of the lighting units of the lighting units, are angled at more than 360°/2n with respect to each other.

6. An exterior aircraft light according to claim 1, wherein at least 80% of the lighting units, have orientation directions of the elongated light sources that are angled with respect to each other.

7. Exterior aircraft light according to claim 6,
   wherein the orientation directions of the elongated light sources of said at least 50% of the lighting units, are angled at more than 5° with respect to each other, and/or
   wherein the plurality of lighting units consists of n lighting units and wherein the orientation directions of the elongated light sources of said at least 50% of the lighting units of the lighting units, are angled at more than 360°/2n with respect to each other.

8. An exterior aircraft light according to claim 1, wherein the plurality of lighting units consists of n lighting units and wherein the orientation directions of the n lighting units are angled at respective angles $\alpha_k$ with respect to a reference direction on the base plate, with $$(360°/n)*k-(d*(360°/n)) \leq \alpha_k \leq (360°/n)*k+(d*(360°/n)),$$

with k being between 1 and n and with d being between 0 and 0.2.

9. An exterior aircraft light according to claim 1, wherein the main output directions of any two of the plurality of lighting units enclose an angle of less than 10°, in particular of less than 5°.

10. An exterior aircraft light according to claim 1, wherein the elongated LED light source of each of the plurality of lighting units comprises a plurality of LEDs, arranged in a line configuration.

11. An exterior Exterior aircraft light according to claim 1, wherein the collimating optical system of each of the plurality of lighting units comprises:
    a parabolic reflector and a collimating lens, with the light from the respective elongated LED light source being partially collimated by the parabolic reflector and partially collimated by the collimating lens.

12. An exterior aircraft light according to claim 1, wherein a focal point of the collimating optical system of each of the plurality of lighting units is positioned on the light emitting surface of the respective elongated LED light source.

13. An exterior aircraft light according to claim 12, wherein the elongated LED light source of each of the plurality of lighting units comprises an odd number of LEDs, arranged in a line configuration, with a respective center LED of the odd number of LEDs being positioned in the focal point of the respective collimating optical system.

14. An exterior aircraft light according to claim 1, wherein an output light intensity distribution of the exterior aircraft light has a principal light output direction and wherein the output light intensity distribution is a monotonically decreasing light intensity distribution around the principal light output direction.

15. An exterior aircraft light according to claim 1, wherein an output light intensity distribution of the exterior aircraft light is a rotationally symmetric light intensity distribution.

16. An exterior aircraft light according to claim 1, wherein the exterior aircraft light is an aircraft headlight, such as an air plane landing light, an air plane take off light, an air plane taxi light, an air plane runway turnoff light, and a rotorcraft search light.

17. An aircraft comprising at least one exterior aircraft light according to claim 1.

* * * * *